United States Patent
Kim et al.

(10) Patent No.: US 11,380,133 B2
(45) Date of Patent: Jul. 5, 2022

(54) DOMAIN ADAPTATION-BASED OBJECT RECOGNITION APPARATUS AND METHOD

(71) Applicant: Electronics and Telecommunications Research Institute, Daejeon (KR)

(72) Inventors: Hyung Il Kim, Daejeon (KR); Yong Jin Kwon, Daejeon (KR); Jin Young Moon, Daejeon (KR); Jong Youl Park, Daejeon (KR); Sung Chan Oh, Seoul (KR); Ki Min Yun, Daejeon (KR); Jeun Woo Lee, Gyeryong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 75 days.

(21) Appl. No.: 16/834,500

(22) Filed: Mar. 30, 2020

(65) Prior Publication Data
US 2020/0311389 A1    Oct. 1, 2020

(30) Foreign Application Priority Data
Apr. 1, 2019    (KR) .................. 10-2019-0038049

(51) Int. Cl.
*G06V 10/20*    (2022.01)
*G06V 40/16*    (2022.01)
*G06V 20/40*    (2022.01)

(52) U.S. Cl.
CPC .......... *G06V 40/172* (2022.01); *G06V 10/255* (2022.01); *G06V 20/46* (2022.01)

(58) Field of Classification Search
None
See application file for complete search history.

(56) References Cited

U.S. PATENT DOCUMENTS

| 8,913,798 B2 | 12/2014 | Kim et al. |
| 9,430,694 B2 | 8/2016 | Iliadis et al. |
| 9,530,052 B1 | 12/2016 | Pillai et al. |
| 10,614,343 B2 | 4/2020 | Wang et al. |
| 2015/0016733 A1 | 1/2015 | Park et al. |
| 2015/0242678 A1 | 8/2015 | Lee et al. |
| 2019/0087648 A1* | 3/2019 | Du .................. G06K 9/4628 |
| 2019/0279009 A1* | 9/2019 | Srirangam Narashiman ............... G06T 7/248 |
| 2019/0332850 A1* | 10/2019 | Sharma ............. G06K 9/00308 |

(Continued)

FOREIGN PATENT DOCUMENTS

| JP | 2018-529157 | 10/2018 |
| KR | 10-1016758 | 2/2011 |

(Continued)

*Primary Examiner* — Idowu O Osifade
(74) *Attorney, Agent, or Firm* — Kile Park Reed & Houtteman PLLC (57) ABSTRACT

A domain adaptation-based object recognition apparatus includes a memory configured to store a domain adaptation-based object recognition program and a processor configured to execute the program. The processor learns a generative model for generating a feature or an image similar to a gallery image on the basis of domain adaptation in association with an input probe image and learns an object recognition classification model by using a learning database corresponding to the gallery image and the input probe image, thereby performing object recognition using the input probe image.

8 Claims, 7 Drawing Sheets

(56) References Cited

U.S. PATENT DOCUMENTS

| | | | |
|---|---|---|---|
| 2020/0125836 A1* | 4/2020 | Xu | G06N 3/0472 |
| 2020/0151940 A1* | 5/2020 | Yu | G06T 15/04 |
| 2020/0184053 A1* | 6/2020 | Kursun | G06K 9/00899 |
| 2020/0265219 A1* | 8/2020 | Liu | G06K 9/00288 |

FOREIGN PATENT DOCUMENTS

| | | |
|---|---|---|
| KR | 10-1241625 | 3/2013 |
| KR | 10-2013-0048088 | 5/2013 |
| KR | 10-1314293 | 10/2013 |

* cited by examiner

DOMAIN ADAPTATION-BASED OBJECT RECOGNITION APPARATUS AND METHOD

CROSS-REFERENCE TO RELATED APPLICATIONS

This application claims priority under 35 U.S.C. § 119 to Korean Patent Application No. 10-2019-0038049, filed on Apr. 1, 2019, the disclosure of which is incorporated herein by reference in its entirety.

TECHNICAL FIELD

The present invention relates to a domain adaptation-based object recognition apparatus and method.

BACKGROUND

Conventional object recognition technology performs processes such as object detection, preprocessing, feature extraction, recognition/matching, etc.

In the conventional object recognition technology, currently input information is recognized based on previously registered information, and a feature extraction technique robust to preprocessing or an environment change has been proposed for compensating for various environment changes. However, there is a limitation which cannot compensate for all changes which occur actually, and a large amount of data is needed for robust feature extraction learning.

SUMMARY

Accordingly, the present invention provides a domain adaptation-based object recognition apparatus and method which are robust to an external environment change by learning a style of a gallery image or feature on the basis of a probe image and a gallery image of a limited set and by generating a new image or feature similar to the style of the gallery image on the basis of the probe image through domain adaptation.

In one general aspect, a domain adaptation-based object recognition apparatus includes a memory configured to store a domain adaptation-based object recognition program and a processor configured to execute the program, wherein the processor learns a generative model for generating a feature or an image similar to a gallery image on the basis of domain adaptation in association with an input probe image and learns an object recognition classification model by using a learning database corresponding to the gallery image and the input probe image, thereby performing object recognition using the input probe image.

In another general aspect, a domain adaptation-based object recognition apparatus includes a data collector configured to collect a face image, a generative model learning unit configured to learn a style of a gallery face image, a classification model learning unit configured to learn a classification model by using personal information requiring previous registration for performing face recognition and matching, and a recognition verifier configured to perform recognition on a real input face image by using the generative model and the classification model.

In another general aspect, a domain adaptation-based object recognition method includes collecting an object image, learning a style of a gallery image to learn a generative model, learning a classification model by using personal information requiring previous registration for object recognition, and recognizing an object included in an image by using the generative model and the classification model.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter.

The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, in order to help understanding of those skilled in the art, a background of the present invention proposed will be described first, and embodiments of the present invention will be described.

Conventional face recognition technology performs processes such as object detection, preprocessing, feature extraction, recognition, and matching, etc.

The face recognition technology is classified into technology for comparing a previously registered gallery face image with an actually input probe face image to recognize personal information and face verification technology for determining whether persons are the same persons when two images are input.

In such an environment, pieces of previously registered gallery face image information are photographed in a relatively limited environment. However, in an input probe face image, the probe face image is obtained in various environments such as an illumination change, a pose change, and a low resolution, and due to this, a degraded image is input.

In the related art, in order to perform effective face recognition in such an environment, preprocessing technology (illumination correction and filtering, pose correction, high-resolution realization, etc.) for compensating for various environment changes and a feature extraction technique robust to an environment change have been mainly developed.

However, the preprocessing technology cannot compensate for all changes which occur actually, and a preprocessing algorithm has been heuristically developed but has a limitation in automatically detecting and correcting all problems.

Moreover, a method based on deep learning is being developed for extracting a feature robust to an environment change. However, comparing gallery faces with face images used for learning, there is a style difference and there is a problem where a large amount of data including various changes is needed for allowing a robust feature extractor to learn.

The present invention is proposed for solving the above-described problems and proposes a domain adaptation-based object recognition apparatus and method which generate a new image or feature similar to a style of a gallery face image through domain adaptation of a probe face image having various changes obtained in real world, based on learning using previously registered gallery face images in performing face recognition in a smart control or access control system, thereby decreasing a mismatch between the gallery face image and the probe face image and performing effective recognition/matching.

According to an embodiment of the present invention, a style of a gallery face image may be learned by using a probe face image and a gallery face image of a limited set, and based on domain adaptation of the probe face image using learned model, a new image or feature similar to styles of gallery face images may be generated.

Domain adaptation is technology which, when there are a plurality of domains, generates data similar to different domains or enables a model, learned in a specific domain, to effectively operate in another domain when the model is used in the other domain.

According to an embodiment of the present invention, face recognition may be performed by extracting a feature of a generated probe face image and a feature of a generated gallery face image, and a mismatch between the gallery face image and the probe face image may be reduced, thereby enabling effective face recognition.

Figure 1:
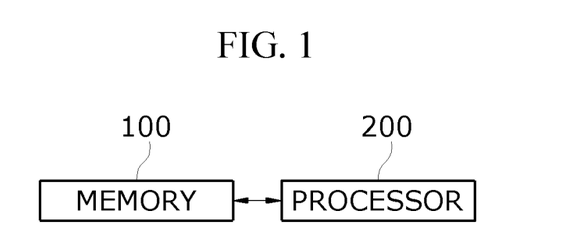
FIGS. 1 and 2 are block diagrams illustrating a domain adaptation-based object recognition apparatus according to an embodiment of the present invention.

FIG. 1 is a block diagram illustrating a domain adaptation-based object recognition apparatus according to an embodiment of the present invention.

The domain adaptation-based object recognition apparatus according to an embodiment of the present invention may include a memory 100 which stores a domain adaptation-based object recognition program and a processor 200 which executes the program. The processor 200 may learn a generative model for generating a feature or an image similar to a gallery image on the basis of domain adaptation in association with an input probe image and may learn an object recognition classification model by using a learning database corresponding to the gallery image and the probe image, thereby performing object recognition using the input probe image.

The processor 200 may perform preprocessing on the basis of feature information about an object to build the learning database and may learn the generative model on the basis of a result of the performed preprocessing by using a gallery image database and an external image database unregistered in a gallery.

The processor 200 may determine whether an input image is not included in the learning database, and thus, may classify an image source and may generate a new image or feature based on domain adaptation, based on a result of the determination. Also, the processor 200 may determine an object identification (ID) to learn a style of a gallery image.

The processor 200 may allow an object ID classifier to learn by performing preprocessing and feature extraction on the learning database, thereby learning the object recognition classification model.

In this case, the processor 200 may perform error calculation on a result output through the object ID classifier to allow the object ID classifier to learn.

The processor 200 may detect an object region from an input image received thereby, generate a new image or feature similar to a gallery image from the input image by using the generative model, and perform feature extraction on the new image by using the object recognition classification model, thereby obtaining ID information about the object.

Figure 2:
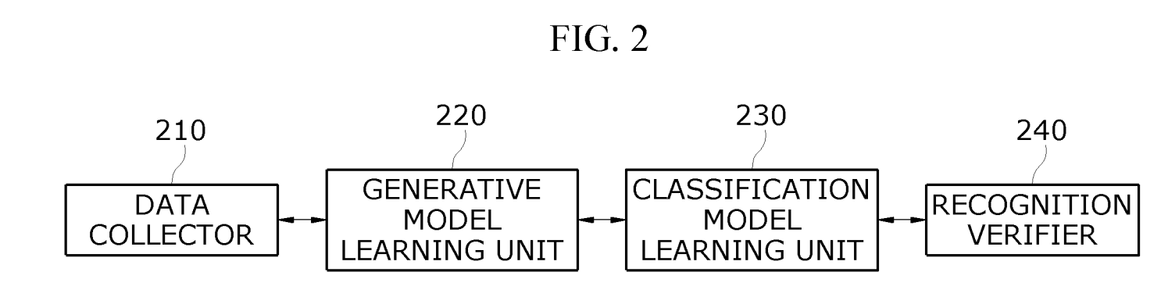

FIG. 2 is a block diagram illustrating a domain adaptation-based object recognition apparatus according to an embodiment of the present invention.

The domain adaptation-based object recognition apparatus according to an embodiment of the present invention may include a data collector 210 which collects face images needed for model learning and classification and matching, a generative model learning unit 220 which learns a style of a gallery face image to generate a new face image similar to the gallery face image through domain adaptation in association with an input probe image, a classification model learning unit 230 which learns a classification model by using personal information requiring previous registration for performing face recognition and matching, and a recognition verifier 240 which performs recognition on a real input face image by using the generative model and the classification model.

Figure 3:
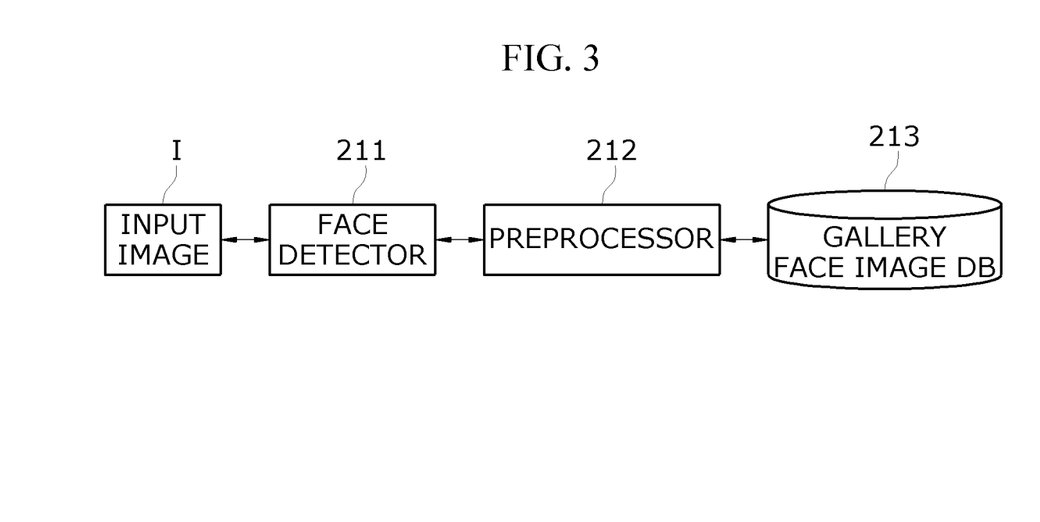
FIG. 3 is a block diagram illustrating a data collector according to an embodiment of the present invention.

FIG. 3 is a block diagram illustrating a data collector according to an embodiment of the present invention.

The data collector according to an embodiment of the present invention may perform preprocessing on a face image by using feature point information and may build a gallery face image database.

Referring to FIG. 3, the data collector may include a face detector 211 and a preprocessor 212.

The face detector 211 may detect a region including a face corresponding to an input image I, and the preprocessor 212 may perform preprocessing such as face alignment or brightness value normalization using feature information on a detected face image to build a gallery face image database 213.

The data collector may build the gallery face image database 213 by photographing off-line a person who is to be previously registered for face recognition, or may additionally obtain an image, needed for training, from Web.

Figure 4:
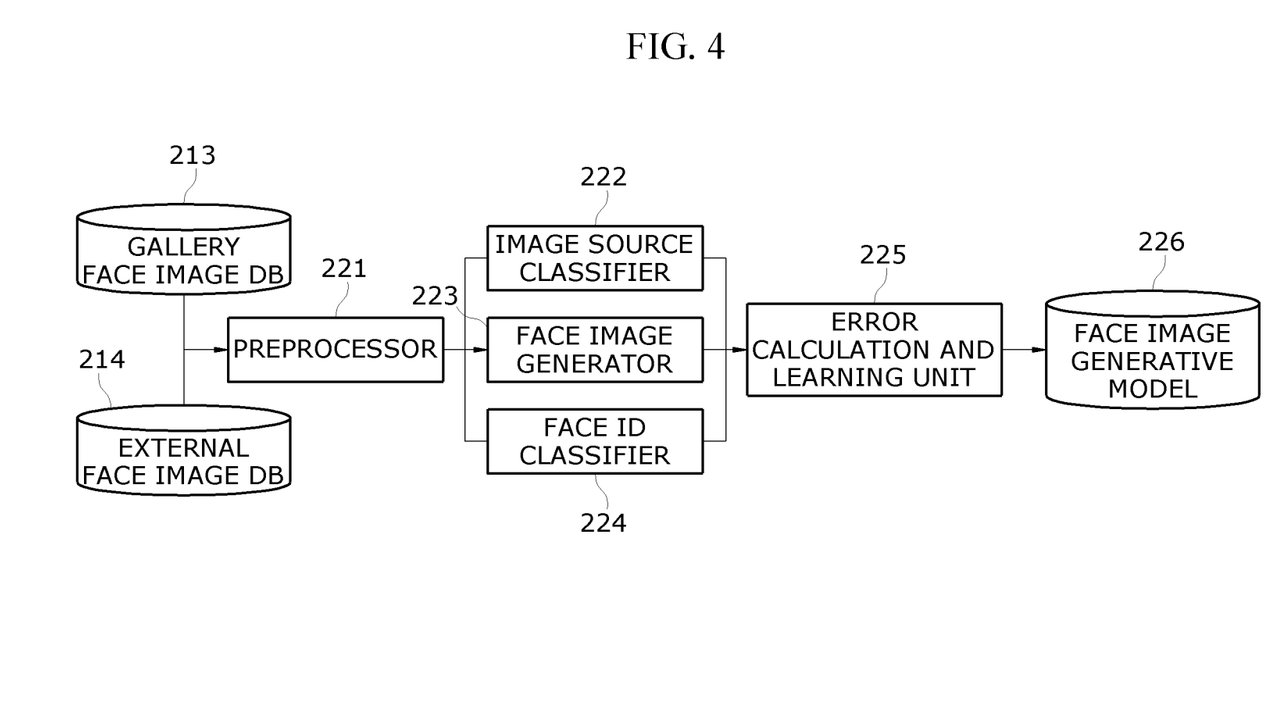
FIG. 4 is a block diagram illustrating a generative model learning unit according to an embodiment of the present invention.

FIG. 4 is a block diagram illustrating a generative model learning unit according to an embodiment of the present invention.

The generative model learning unit may learn a face image generative model by using the gallery face image database 213 and an external face image database 214 and may include a preprocessor 221, an image source classifier 222, a face image generator 223, a face ID classifier 224, and an error calculation and learning unit 225.

The generative model learning unit may determine whether an input image is included in the gallery face image database 213 and may generate a new face image similar to a style of a learned gallery face image on the basis of a result of the determination. Also, generative model learning unit may determine an ID of the input image to learn the face image generative model.

The preprocessor 221 may perform preprocessing (for example, pixel value normalization, image size normalization, etc.) by using the gallery face image database 213 built previously and the external face image database 214 instead of a face registered in a gallery.

According to an embodiment of the present invention, a face image generative model 226 may be learned based on a generative adversarial network learning method, and in order to learn the face image generative model 226, three kinds of models such as the image source classifier 222, the face image generator 223, and the face ID classifier 224 may be simultaneously learned.

The image source classifier 222 may determine whether an input image is included in the gallery face image database 213, the face image generator 223 may be a model for generating a new image or feature, and the face ID classifier 224 may determine an ID of an input face image.

The face ID classifier 224 may determine the ID of the input face image, and thus, in generating a face image, an image having a similar style may be generated while maintaining the ID.

The error calculation and learning unit 225 may calculate an error from a result output through the above-described three kinds of models and may repeatedly perform learning, thereby learning a style of a gallery face image by learning the image source classifier 222 and simultaneously learning the face image generative model 226 which does not lose ID information thereof.

Figure 5:
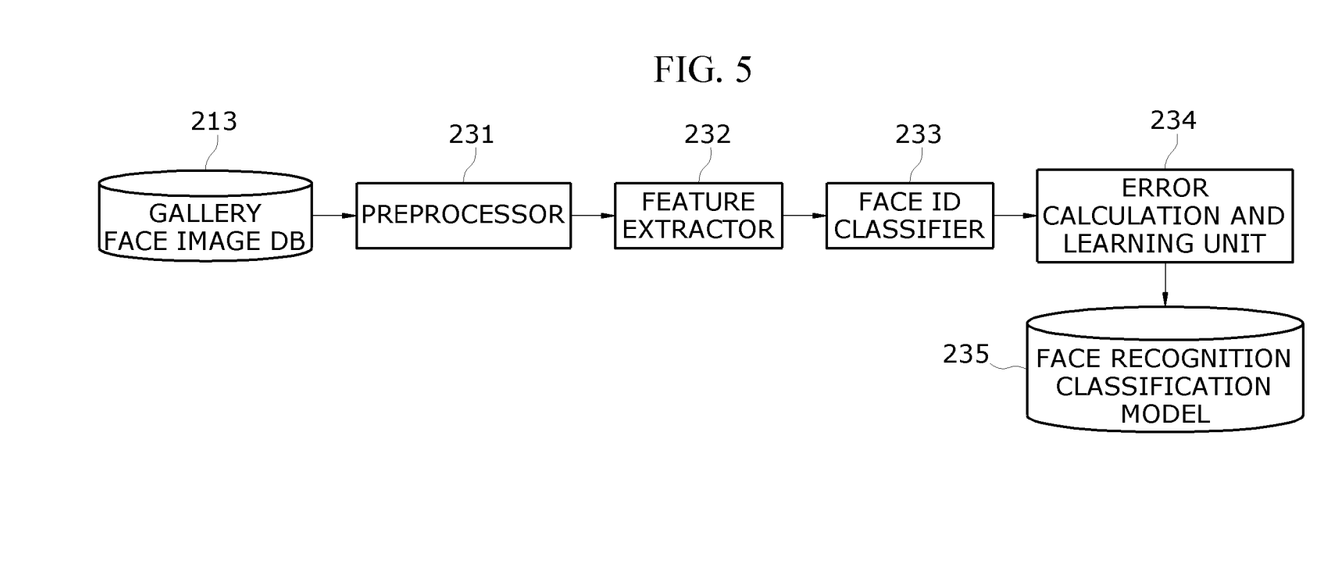
FIG. 5 is a block diagram illustrating a classification model learning unit according to an embodiment of the present invention.

FIG. 5 is a block diagram illustrating a classification model learning unit according to an embodiment of the present invention.

The classification model learning unit according to an embodiment of the present invention may perform preprocessing based on a previously collected gallery face image database 213 and may perform error calculation on the basis of a face ID classification result based on feature extraction, and thus, may allow a face ID classifier 233 to learn and may learn a face recognition classification model 235 by using personal information requiring previous registration.

A preprocessor 231 may perform preprocessing on the previously collected gallery face image database 213 and may allow the face ID classifier 233 to learn through error calculation by using an output of the face ID classifier 233 after feature extraction by the feature extractor 232.

In this case, in a deep network, all of the feature extractor 232 and the face ID classifier 233 may be configured with a neural network, and an initial value may be set by using a backbone network (for example, VGG face) learned based on a large amount of face data.

Figure 6:
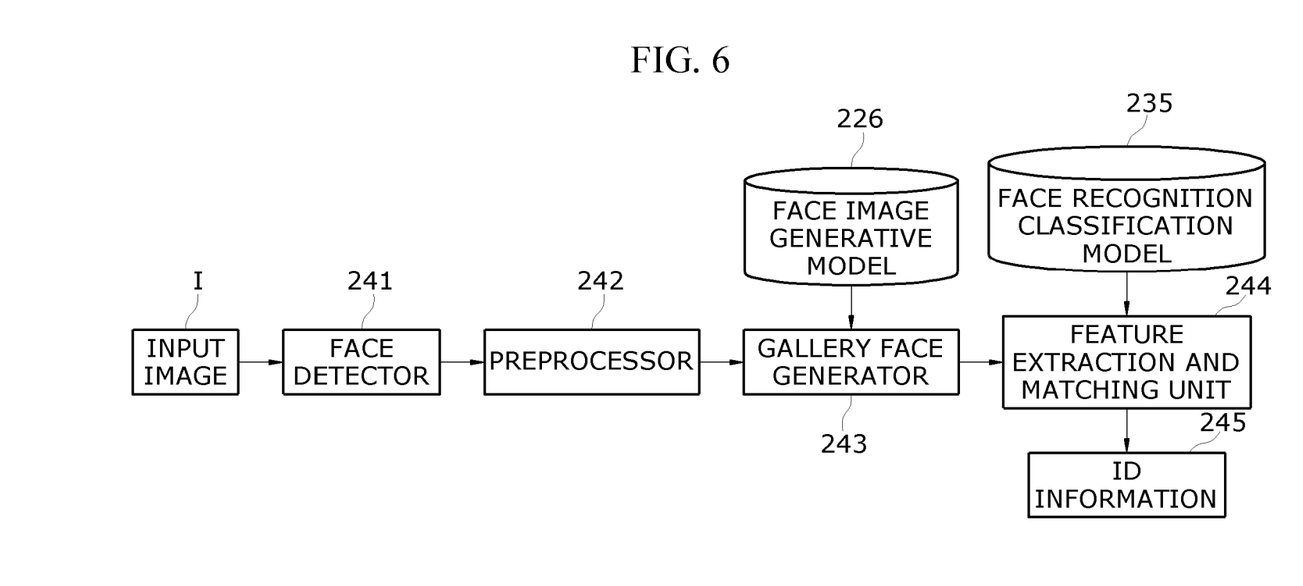
FIG. 6 is a block diagram illustrating a recognition verifier according to an embodiment of the present invention.

FIG. 6 is a block diagram illustrating a recognition verifier according to an embodiment of the present invention.

A face detector of the recognition verifier may detect a face region from each frame obtained from a video input, a face image generator 243 may generate a new face image by using a face image generative model 226 so that an input face image is similar to a gallery face image, and a feature extraction and matching unit 244 may perform feature extraction and matching by using a face recognition classification model 235 to obtain ID information 245.

Figure 7:
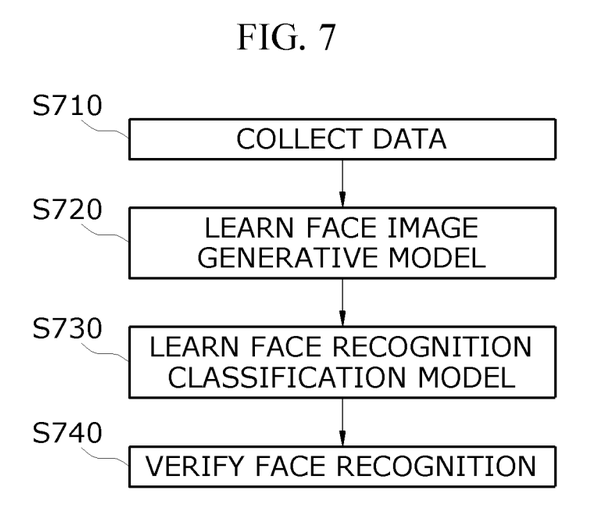
FIG. 7 is a block diagram illustrating a domain adaptation-based object recognition method according to an embodiment of the present invention.

FIG. 7 is a block diagram illustrating a domain adaptation-based object recognition method according to an embodiment of the present invention.

The domain adaptation-based object recognition method according to an embodiment of the present invention may include step S710 of collecting an object image, step S720 of learning a style of a gallery image to learn a generative model, step S730 of learning a classification model by using information requiring previous registration for object recognition, and step S740 of recognizing an object included in an image by using the generative model and the classification model.

In step S710, preprocessing may be performed on an object image by using feature point information, and a gallery image database may be built.

In step S720, the generative model for generating a new image or feature, matching a style of the gallery image, from an input image may be learned by using a gallery image database and an external image database.

In step S730, preprocessing and feature extraction may be performed by using the gallery image database, and by performing error calculation based on an ID classification result, an ID classifier may learn.

In step S740, an object region may be detected from each frame obtained from a video input, a new image or feature may be generated by using the generative model so that the object is similar to the gallery image, a feature may be extracted and matching may be performed by using the classification model, and ID information about the object may be obtained.

The domain adaptation-based object recognition method according to an embodiment of the present invention may be implemented in a computer system or may be recorded in a recording medium. The computer system may include one or more processors, a memory, a user input device, a data communication bus, a user output device, and a storage. The above-described elements may perform data communication therebetween through the data communication bus.

The computer system may further include a network interface coupled to a network. The one or more processors may each be a central processing unit (CPU) or may be a semiconductor device that executes commands stored in the memory and/or the storage.

The memory and the storage may each include various types of volatile or nonvolatile storage mediums. For example, the memory may include read-only memory (ROM) and random access memory (RAM).

Therefore, the domain adaptation-based object recognition method according to an embodiment of the present invention may be implemented as a method executable by a computer. When the domain adaptation-based object recognition method according to an embodiment of the present invention is performed by a computer device, computer-readable instructions may perform the object recognition method according to an embodiment of the present invention.

The domain adaptation-based object recognition method according to an embodiment of the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

According to the embodiments of the present invention, the domain adaptation-based object recognition apparatus and method may be applied to an access control system and recognition of an ID card (a resident registration certificate, a passport, etc.) where a difference between a gallery face image and a probe face image is large, may learn a style of the gallery face image by using the gallery face image captured in a limited environment and a face image having various changes, and may generate a new image (an image similar to the style of the gallery image) or feature from an input of the probe face image on the basis of a learning model, thereby decreasing a mismatch between the gallery face image and the probe face image and performing face recognition robust to an external environment change.

According to the embodiments of the present invention, learning of a face image generative model and learning of a face recognition classification model may be simultaneously performed, and thus, reliability in performing face recognition robust to an external environment change may increase.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A domain adaptation-based object recognition apparatus comprising:
    a memory configured to store a domain adaptation-based object recognition program; and
    a processor configured to execute the program,
    wherein the processor learns a generative model for generating a feature or an image similar to a gallery image on the basis of domain adaptation in association with an input probe image and learns an object recognition classification model by using a learning database corresponding to the gallery image and the input probe image, thereby performing object recognition using the input probe image,
    wherein the processor performs preprocessing by using the learning database and an external image database unregistered in a gallery to generate the generative model,
    wherein the processor determines whether an input image is included in a gallery face image database, detects an object region from the input image received thereby, generates a new image or feature similar to the gallery image from the input image by using the generative model, and performs feature extraction on the generated new image by using the object recognition classification model, thereby obtaining identification (ID) information about the object, and
    wherein the processor performs error calculation on the basis of a face identification (ID) classification result based on preprocessing and feature extraction using the gallery image to allow a face ID classifier to repeatedly perform learning while simultaneously learning a style of the gallery image and learning the generative model without losing ID information.

2. The domain adaptation-based object recognition apparatus of claim 1, wherein the processor performs preprocessing on the basis of feature information about an object to build the learning database.

3. The domain adaptation-based object recognition apparatus of claim 1, wherein the processor classifies an image source, generates a new image based on domain adaptation, and determines an object identification (ID), thereby learning a style of the gallery image.

4. The domain adaptation-based object recognition apparatus of claim 1, wherein the processor allows an object identification (ID) classifier to learn by performing preprocessing and feature extraction on the learning database, thereby learning the object recognition classification model.

5. A domain adaptation-based object recognition apparatus comprising:
    a data collector processor configured to collect a face image;
    a generative model learning processor configured to learn a style of a gallery face image;
    a classification model learning processor configured to learn a classification model by using personal information requiring previous registration for performing face recognition and matching; and
    a recognition verifier processor configured to perform recognition on a real input face image by using the generative model and the classification model,
    wherein the data collector processor performs preprocessing on the face image by using feature point information and builds a gallery face image database,
    wherein the classification model learning processor performs error calculation on the basis of a face identification (ID) classification result based on preprocessing and feature extraction using the gallery face image database to allow a face ID classifier to repeatedly perform learning while simultaneously learning the style of the gallery face image and learning the generative model without losing ID information,
    wherein the generative model learning unit processor learns a face image generative model by using the gallery face image database and an external face image database, and
    wherein the generative model learning unit processor determines whether an input image is included in the gallery face image database, generates a new face image similar to a style of a learned gallery face image, and determines identification (ID) of the input image to learn the face image generative model.

6. The domain adaptation-based object recognition apparatus of claim 5, wherein the recognition verifier processor detects an object region from each frame obtained from a video input, generates a new image or feature by using the generative model so that an input face image is similar to a gallery face image, and performs feature extraction and matching by using the classification model, thereby obtaining identification (ID) information.

7. A domain adaptation-based object recognition method comprising:
    step (a) of collecting an object image;
    step (b) of learning a style of a gallery image to learn a generative model;
    step (c) of learning a classification model by using personal information requiring previous registration for object recognition; and
    step (d) of recognizing an object included in an image by using the generative model and the classification model,
    wherein the step (a) comprises performing preprocessing on the object image by using feature point information and building a gallery image database,
    wherein the step (b) comprises learning the generative model for generating a new image or feature, determining whether an input image is included in the gallery face image database, matching a style of the gallery image, from an input image by using a gallery database and an external image database, and
    wherein the step (c) comprises performing preprocessing and feature extraction by using a gallery image database and performing error calculation on the basis of a face identification (ID) classification result to allow a face ID classifier to repeatedly perform learning while simultaneously learning the style of the gallery face image and learning the generative model without losing ID information.

8. The domain adaptation-based object recognition method of claim 7, wherein the step (d) comprises detecting an object region from each frame obtained from a video input, generating a new image or feature by using the generative model so that the object is similar to the gallery image, and performing feature extraction and matching by using the classification model, thereby obtaining identification (ID) information about the object.

\* \* \* \* \*